United States Patent [19]

Suyama et al.

[11] Patent Number: 5,296,549
[45] Date of Patent: Mar. 22, 1994

[54] VULCANIZABLE RUBBER COMPOSITION CONTAINING A PEROXIDE CROSSLINKER

[75] Inventors: Shuji Suyama; Hideyo Ishigaki, both of Aichi; Masayasu Tomoda, Osaka; Yoshihiro Shirai, Osaka; Hiroyuki Tanaka, Osaka; Masaharu Komai, Osaka, all of Japan

[73] Assignee: Daikin Industries Ltd., Osaka, Japan

[21] Appl. No.: 858,505

[22] Filed: Mar. 27, 1992

[30] Foreign Application Priority Data

Mar. 27, 1991 [JP] Japan .................................. 3-62923

[51] Int. Cl.$^5$ ................................................ C08F 8/00
[52] U.S. Cl. ................................... 525/326.3; 525/387
[58] Field of Search ....................................... 525/326.3

[56] References Cited

U.S. PATENT DOCUMENTS

| | | |
|---|---|---|
| 4,035,565 | 7/1977 | Apotheker et al. |
| 4,214,060 | 7/1980 | Apotheker et al. |
| 4,243,770 | 1/1981 | Tatemoto et al. |
| 4,831,085 | 5/1989 | Okabe ................... 525/387 |
| 5,077,359 | 12/1991 | Moore ................... 526/206 |

FOREIGN PATENT DOCUMENTS

| | | |
|---|---|---|
| 0410351 | 1/1991 | European Pat. Off. |
| 3925743 | 2/1990 | Fed. Rep. of Germany |
| 4006058 | 8/1991 | Fed. Rep. of Germany |
| 1603481 | 11/1981 | United Kingdom |
| 1603482 | 11/1981 | United Kingdom |

*Primary Examiner*—Christopher Henderson
*Attorney, Agent, or Firm*—Birch, Stewart, Kolasch & Birch

[57] ABSTRACT

A vulcanizable rubber composition which contains an iodine- or bromine-containing rubber and an organic peroxide of the formula:

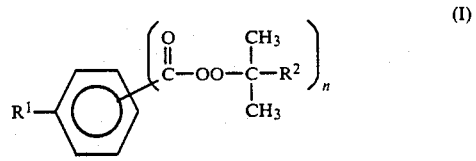

(I)

wherein $R^1$ is a hydrogen atom, a chlorine atoms or methyl group, $R^2$ is a linear or branched alkyl group having 2 to 5 carbon atoms, and n is an integer of 1 to 3, generates only a small amount of methyl iodide or methyl bromide during the vulcanization.

5 Claims, No Drawings

VULCANIZABLE RUBBER COMPOSITION CONTAINING A PEROXIDE CROSSLINKER

BACKGROUND OF THE INVENTION

1. Field of the Invention

The present invention relates to a vulcanizable rubber composition.

2. Description of Related Art

A cured material prepared by vulcanizing an iodine- or bromine-containing rubber is used in various fields. Hitherto, a large amount of methyl iodide or methyl bromide is generated when the iodine- or bromine-containing rubber is vulcanized with a peroxide. Methyl iodide and methyl bromide are poisonous and disadvantageous in view of environmental health.

SUMMARY OF THE INVENTION

An object of the present invention is to provide a vulcanizable rubber composition comprising an iodine- or bromine-containing rubber and a peroxide, which composition generates only a small amount of methyl iodide and a methyl bromide during the vulcanization.

This and other objects are achieved by a vulcanizable rubber composition which comprises an iodine- or bromide-containing rubber and an organic perioxide of the formula:

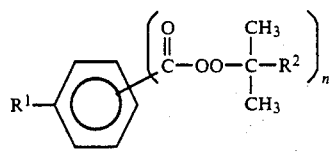

(I)

wherein $R^1$ is a hydrogen atom, a chlorine atom or methyl group, $R^2$ is a linear or branched alkyl group having 2 to 5 carbon atoms, and n is an integer of 1 to 3.

DETAILED DESCRIPTION OF THE INVENTION

A characteristic of the present invention resides in the use of the organic peroxide (I) as a curing agent in the composition.

Specific examples of the organic perioxide (I) are t-amyl peroxybenzoate, t-hexyl peroxybenzoate, 1,3,3,3-tetramethylbutyl peroxybenzoate, t-amyl peroxy-m-methylbenzoate, t-hexyl peroxy-m-methylbenzoate, 1,1,3,3tetramethylbutyl peroxy-m-methylbenzoate, t-hexyl peroxy-p-methylbenzoate, t-hexyl peroxy-o-methylbenzoate, t-hexyl peroxy-p-chlorobenzoate, bis(t-hexyl peroxy)phthalate, bis(t-amyl peroxy)isophthalate, bis(t-hexyl peroxy)isophthalate, bis(t-hexyl peroxy)terephthalate and tris(t-hexyl peroxy)-trimellitate. An amount of the organic peroxide is generally from 0.1 to 5, preferably from 0.2 to 3 parts by weight per 100 parts by weight of the iodine- or bromine-containing rubber.

The iodine- or bromine rubbers are not limited. The iodine- or bromine-containing rubber may be a brominated butyl rubber, and a iodine- or bromine-containing fluororubber. The iodine- or bromine-containing fluororubber is particularly preferable. Specific examples of the iodine- or bromine-containing fluororubber are described in U.S. Pat. Nos. 4,243,770, 4,035,565 and 4,214,060, the disclosures of which are incorporated herein by reference.

The composition according to the present invention may contain an iodine- or bromine-free rubber, a cross-linking aid and a reinforcing agent. The iodine- or bromine-free rubber is not limited. Although it may be a usual rubber, it is preferably a rubber which can be vulcanized with an organic peroxide. An amount of the iodine- or bromine-free rubber is usually from 0 to 80, preferably from 0 to 50% by weight based on the composition. The cross-linking aid is reactive to a peroxy free radical and a polymer radical. Specific examples of the cross-linking aid are a triallyl compound (for example, triallyl cyanurate and triallyl isocyanuarte), a diallyl compound (for example, diallyl phthalate) and the like. An amount of the cross-linking aid is usually from 0 to 10, preferably from 1 to 6% by weight based on the composition. Specific examples of the reinforcing agent are carbon black and the like. An amount of the reinforcing agent is usually from 0 to 80, preferably from 5 to 50% by weight based on the composition.

The composition according to the present invention can be prepared by a generally used mixing method using rolls for rubber, a pressurizing kneader and the like. The composition according to the present invention can be vulcanized under conditions which are used for vulcanizing a usual rubber. For example, the rubber composition is mixed by rolls, the composition is injected in a mold, a press vulcanization is conducted at 100° to 200° C. and 20 to 100 kg/cm²G for 5 to 180 minutes, and then an oven vulcanization is optionally conducted in an oven at 150° to 300° C. for 10 to 240 minutes to prepare a vulcanized rubber.

PREFERRED EMBODIMENTS OF THE INVENTION

The present invention will be illustrated by the following Examples which do not limit the present invention.

EXAMPLES 1

An iodine-containing rubber [Dai-el G-902 (vinylidene fluoride/hexafluoropropylene/tetrafluoroethylene terpolymer manufactured by Daikin Industries, Ltd.)] (100 parts by weight), MT-carbon black (MT-C) (20 parts by weight), triallyl isocyanurate (TAIC) (4 parts by weight) and t-hexyl peroxybenzoate (1.5 parts by weight) as an organic peroxide were homogeneously mixed by rubber rolls to prepare a vulcanizable composition.

Vulcanizability of the composition was evaluated by a curastometer at 150° C. and 160° C. A lowest viscosity ($M_L$), a highest viscosity ($M_H$), an induction time ($T_{10}$) and an optimal vulcanization time ($T_{90}$) were measured. The composition was press vulcanized at 150° C. for 10 minutes and then oven vulcanized at 180° C. for four hours to prepare a sample of 1 mm thickness.

At ordinary state and after aging at 230° C. for 70 hours, a 100% tensile stress ($M_{100}$), a tensile strength at break ($T_B$), an elongation at break ($E_B$) and hardness (Hs) were measured.

A comparison set (C.S.) was measured for a sample of 13 mm thickness prepared by vulcanizing in the same conditions as in the above.

An amount of generated methyl iodide was measured when the composition was vulcanized at 160° for 10 minutes. The amount of generated methyl iodide was measured by charging the vulcanizable composition in a closed vessel, vulcanizing the composition and then determining the amount of methyl iodide present in a vacant part of the vessel by means of a gas chromatography.

Results are shown in Table.

EXAMPLE 2

The same procedure as in Example 1 was repeated except that the organic peroxide was used in an amount of 0.8 part by weight. Results are shown in Table.

EXAMPLE 3

The same procedure as in Example 1 was repeated except that the organic peroxide was used in an amount of 0.4 part by weight. Results are shown in Table.

COMPARATIVE EXAMPLE 1

The same procedure as in Example 1 was repeated except that 2,5-dimethyl-2,5-di(t-butylperoxy)hexane (Perhexa 2.5 B manufactured by Nippon Oil and Fats Co., Ltd.) (1.5 parts by weight) was used as the organic peroxide and the press vulcanization was conducted at 160° C. for 10 minutes. Results are shown in Table.

TABLE

|  | Com. Ex. 1 | Ex. 1 | Ex. 2 | Ex. 3 |
| --- | --- | --- | --- | --- |
| G-902 | 100 | 100 | 100 | 100 |
| MT-C | 20 | 20 | 20 | 20 |
| TAIC | 4 | 4 | 4 | 4 |
| Peroxide 1* | 1.5 | — | — | — |
| ↑    2* | — | 1.5 | 0.8 | 0.4 |
| Vulcanizability (160° C.) | | | | |
| $M_L$ (kg · f) | 0.12 | 0.23 | 0.24 | 0.18 |
| $M_H$ (kg · f) | 3.80 | 7.20 | 7.55 | 4.40 |
| $T_{10}$ (min.) | 0.8 | 0.3 | 0.3 | 0.5 |
| $T_{90}$ (min.) | 2.8 | 0.7 | 1.0 | 2.0 |
| Vulcanizability (150° C.) | | | | |
| $M_L$ (kg · f) | — | 0.24 | 0.22 | 0.21 |
| $M_H$ (kg · f) | — | 5.80 | 4.80 | 3.75 |
| $T_{10}$ (min.) | — | 0.3 | 0.5 | 0.7 |
| $T_{90}$ (min.) | — | 1.2 | 2.3 | 4.3 |
| Vulcanizing condition | | | | |
| Press vulcanization | | | | |
| Temperature (°C.) | 160 | 150 | 150 | 150 |
| Time (min.) | 10 | 10 | 10 | 10 |
| Oven vulcanization | | | | |
| Temperature (°C.) | 180 | 180 | 180 | 180 |
| Time (hr.) | 4 | 4 | 4 | 4 |
| Properties at ordinary state | | | | |
| $M_{100}$ (kg · f/cm$^2$) | 92 | 100 | 100 | 69 |
| $T_B$ (kg · f/cm$^2$) | 208 | 193 | 169 | 187 |
| $E_B$ (%) | 160 | 160 | 160 | 210 |
| Hs (JIS A) | 74 | 74 | 74 | 74 |
| Compression set (%) (200° C. × 72 hrs.) | 21 | 20 | 25 | 40 |
| Amount of generated methyl iodide (mg/kg-comp) | 258 | 49 | 26 | 12 |
| Aging resistance (230° C. × 70 hrs.) | | | | |
| $\Delta M_{100}$ (%) | −26 | −19 | −11 | −3 |
| $\Delta T_B$ (%) | −14 | −10 | −21 | +11 |
| $\Delta E_B$ (%) | +13 | +13 | +12 | ±0 |
| $\Delta Hs$ (point) | −1 | −1 | −2 | −1 |

Note)
Peroxide 1: 2,5-Dimethyl-2,5-di(t-butylperoxy)hexane
Peroxide 2: t-Hexyl peroxybenzoate

What is claimed is:

1. A vulcanizable rubber composition which contains an iodine-containing rubber and an organic peroxide of the formula:

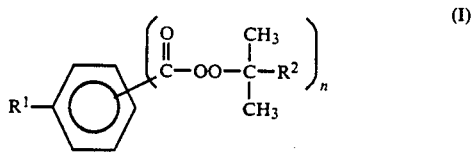

wherein $R^1$ is a hydrogen atom, a chlorine atoms or methyl group, $R^2$ is a linear or branched alkyl group having 3 to 5 carbon atoms, and n is an integer of 1 to 3.

2. The composition according to claim 1, wherein an amount of the organic peroxide is from 0.1 to 5 parts by weight per 100 parts by weight of the rubber.

3. The composition according to claim 1, wherein the organic peroxide is selected from the group consisting of t-hexyl peroxybenzoate, 1,3,3,3-tetramethylbutyl peroxybenzoate, t-hexyl peroxy-m-methylbenzoate, 1,1,3,3-tetramethylbutyl peroxy-m-methylbenzoate, t-hexyl peroxy-p-methylbenzoate, t-hexyl peroxy-o-methylbenzoate, t-hexyl peroxy-p-chlorobenzoate, bis(t-hexyl peroxy)phthalate, bis(t-amyl peroxy)isophthalate, bis(t-hexyl peroxy)isophthalate, bis(t-hexyl peroxy)terephthalate and tris(t-hexyl peroxy)trimellitate.

4. The composition according to claim 1, wherein the rubber is an iodine-containing fluororubber.

5. The composition according to claim 1 wherein said iodine-containing rubber is a vinylidene fluoride/hexafluoropropylene/tetrafluoroethylene terpolymer.

* * * * *